Oct. 29, 1940.  F. W. DUNMORE  2,220,049
ADVERTISING METHOD AND MAGNET MOTIVATED OBJECT
Filed March 18, 1940  3 Sheets-Sheet 1
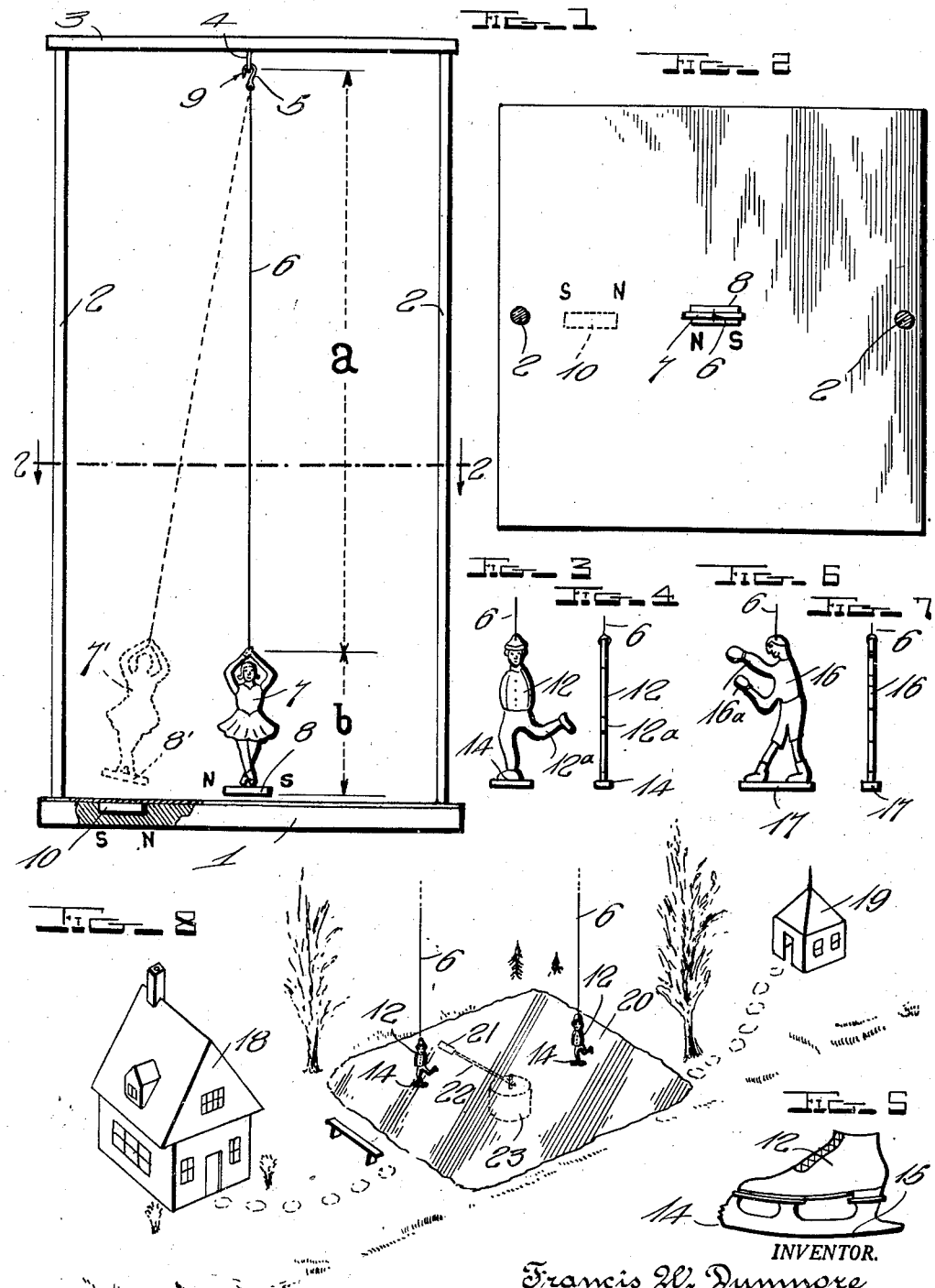
INVENTOR.
Francis W. Dunmore
BY
John B. Brady
Attorney

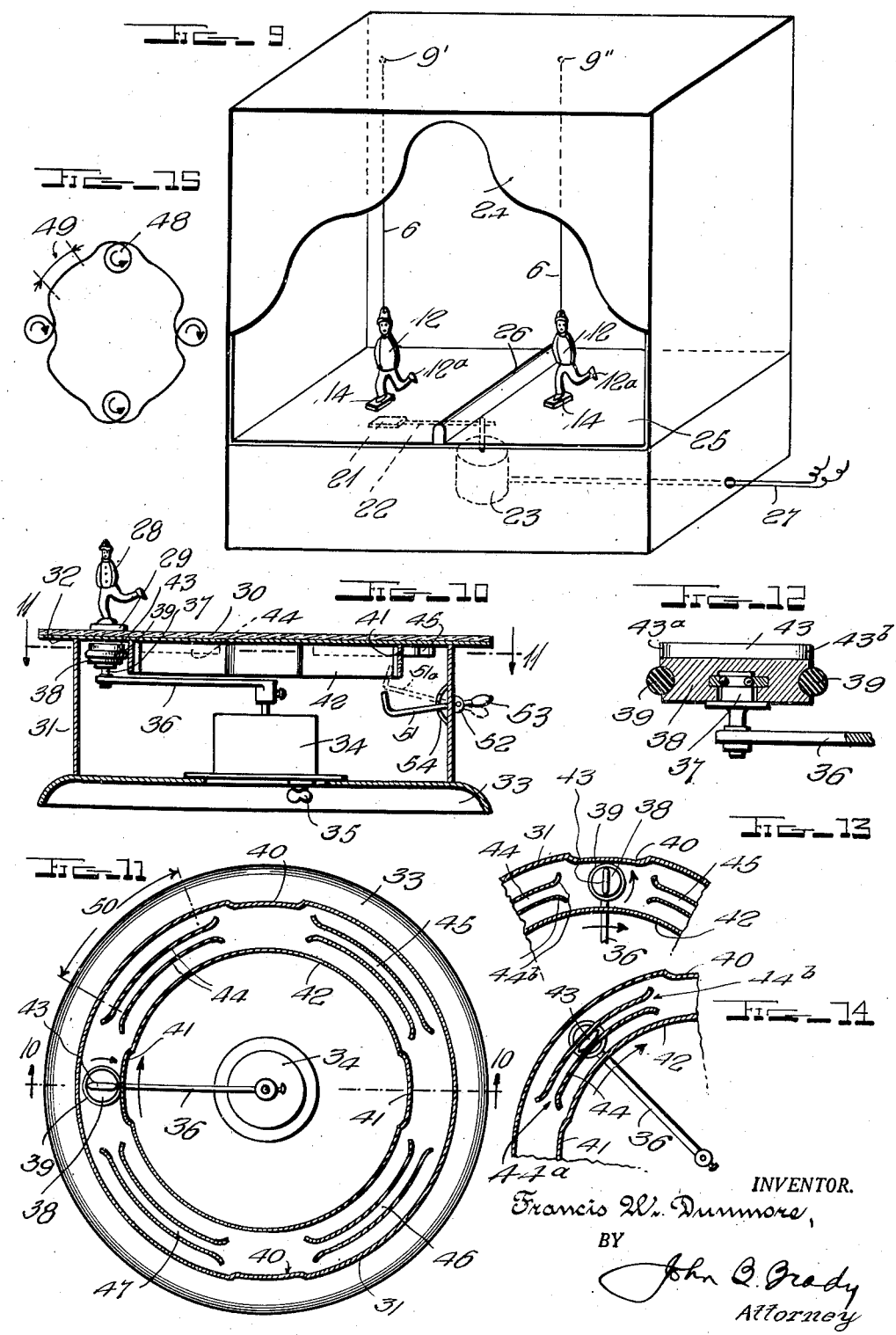

Oct. 29, 1940.  F. W. DUNMORE  2,220,049
ADVERTISING METHOD AND MAGNET MOTIVATED OBJECT
Filed March 18, 1940   3 Sheets-Sheet 3
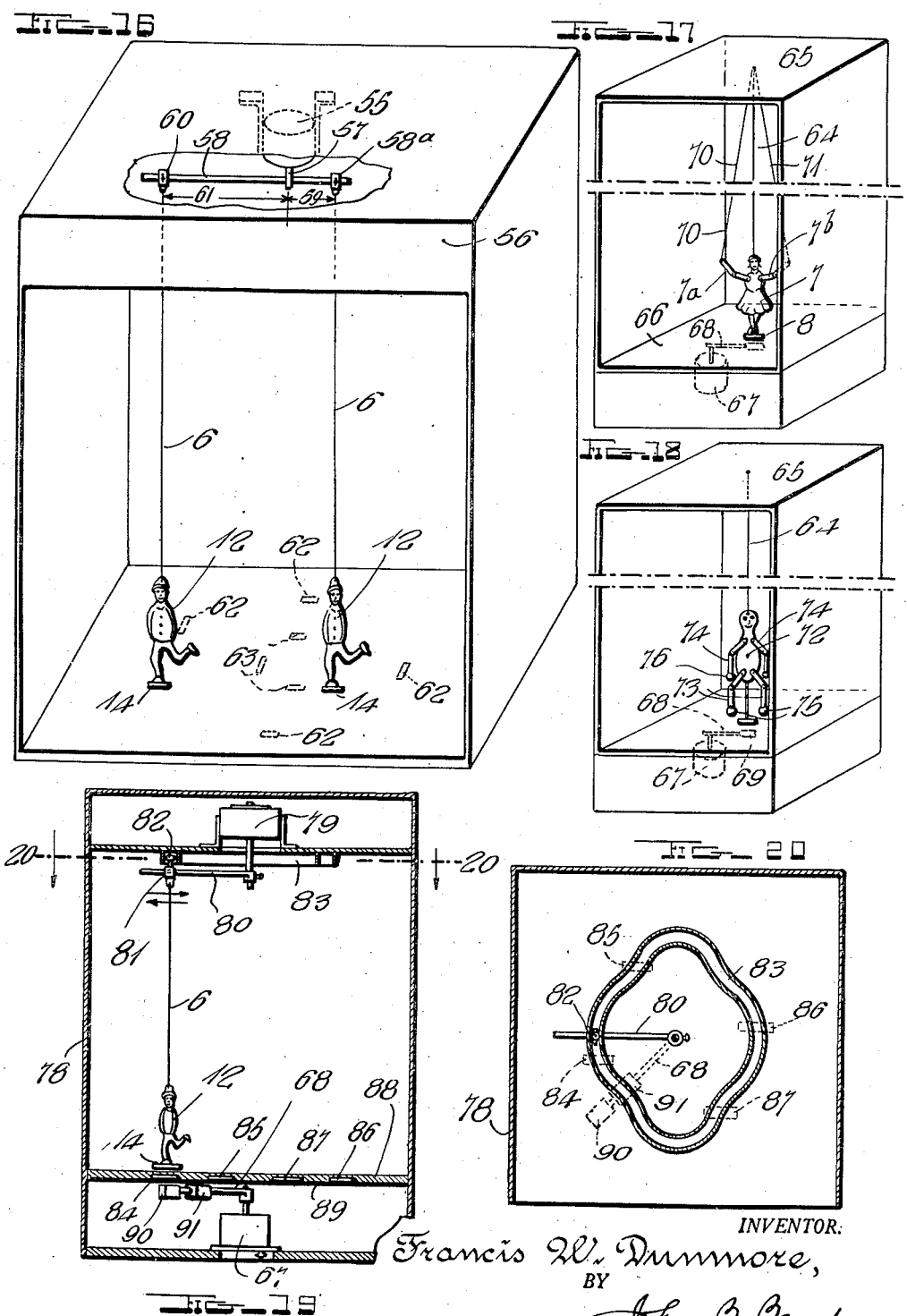
INVENTOR:
Francis W. Dunmore,
BY
John B. Brady
Attorney Patented Oct. 29, 1940

2,220,049

UNITED STATES PATENT OFFICE 2,220,049

ADVERTISING METHOD AND MAGNET MOTIVATED OBJECT

Francis W. Dunmore, Washington, D. C.

Application March 18, 1940, Serial No. 324,690

11 Claims. (Cl. 46—45)

My invention relates broadly to a method and apparatus useful in advertising and more particularly to an animated toy and method and apparatus for producing attractive and fantastical movements of figures or objects.

One of the objects of my invention is to provide a method and apparatus in which figures may be animated to represent natural movements by use of magnetic force.

Another object of my invention is to provide a construction of toy in which a freely suspended figure carrying a magnet thereon may have an initial movement imparted thereto for swinging the figure through a fixed magnetic field by which various attractive, grotesque or fantastical movements may be imparted to the figure.

Still another object of my invention is to provide an arrangement of motivated objects in which objects carrying a magnet thereon are freely suspended to swing through a coacting magnetic field in a position removed from the axis of the suspension for the objects whereby a variety of grotesque, fantastical and attractive movements may be imparted to the objects.

A further object of my invention is to provide an arrangement of magnet motivated objects in which objects equipped with permanent magnets may be moved through a variety of positions by coaction with an alignable magnet which may be either fixed or movable with respect to the objects.

A still further object of my invention is to provide an advertising method employing magnet motivated objects in which a permanent magnet is positively driven in a predetermined path for imparting spins and twists to a movable object equipped with a coacting magnet for thereby effecting movements of the object simulating natural movements.

Another object of my invention is to provide a combined arrangement of movable and stationary magnets which are compositely effective upon a magnet equipped figure whereby the figure is motivated to simulate a variety of spins, twists and movements representative of natural movements.

Still another object of my invention is to provide a mechanism for imparting motion to freely suspended figures equipped with magnets and movable in the path of fixed and motivated magnets for imparting to the figures a variety of movements which are esthetic, fantastical or attractive.

A further object of my invention is to provide an arrangement of jointed figure freely suspended and carrying weighted portions and a magnet thereon and swingable through a movable magnetic field adapted to produce variable movements of the figure.

Other and further objects of my invention reside in an arrangement of inanimate objects in which animated characteristics are imparted through the use of coacting magnetic fields as set forth more fully in the specification hereafter following by reference to the accompanying drawings, in which:

Figure 1 is a front elevational view showing the assembly of one form of apparatus employed in carrying out my invention; Fig. 2 is a transverse sectional view taken on line 2—2 of Fig. 1; Figs. 3 and 4 are front and side elevational views respectively of an ice skater figure employed in one arrangement of my invention; Fig. 5 is a view of a magnetic skate which may be employed on the figure illustrated in Figs. 3 and 4; Figs. 6 and 7 are front and side elevational views of a boxer figure employed in a modified form of my invention; Fig. 8 is a panoramic display view showing my invention employed in a method of advertising; Fig. 9 is a perspective view of a stage setting illustrating the principles of my invention; Fig. 10 is a vertical sectional view taken through a modified form of my invention; Fig. 11 is a transverse sectional view taken on line 11—11 of Fig. 10; Fig. 12 is a fragmentary view illustrating the control means for the motivating magnet employed in the arrangement of Figs. 10 and 11; Figs. 13 and 14 show different positions of the motivating magnet employed in the structure of Figs. 10 and 11; Fig. 15 shows the path described by the figure employed in the arrangement of Figs. 10–14 for simulating the movements of an ice skater; Fig. 16 shows a further modified form of system carrying out the principles of my invention; Fig. 17 shows another modified form of the system of my invention; Fig. 18 illustrates the magnetic system of my invention applied to a jointed figure for producing grotesque movements; Fig. 19 is a vertical sectional view illustrating a composite movable magnet and permanent magnet system and variable suspension system for figure toys which may be employed in carrying out the method of my invention; and Fig. 20 is a transverse sectional view taken on line 20—20 of Fig. 19.

My invention is directed to a method and apparatus useful in show window display for advertising. My invention is also applicable to toys in which various grotesque and fantastical movements may be imparted to figure toys by mounting on the figure toy a permanent magnet and transversely suspending the figure toy to enable the figure toy to swing through a fixed magnet field which coacts with the magnet carried by the figure toy to produce various twists and turns and composite movements in the figure toy. Such movements may simulate natural movements of a skater when the figure of a skater is portrayed with the skate element thereon constructed from a magnet. Figure toys such as ballet dancers, boxers, cocks, etc., may be employed and esthetic, grotesque and fantastical movements imparted thereto as the figures swing freely from a suspension position through a fixed magnetic field. To obtain the coaction between the magnet carried by the figure and the controlling magnet, I employ permanent magnets formed from an alloy of aluminum, nickel and cobalt possessing high magnetic strength substantially permanent in character. It is because of the substantial magnetic field emanating from permanent magnets of this alloy that the devices of my invention may be successfully produced. In addition to the movements imparted to a suspended figure by movement of the figure over a permanent magnet, my invention also contemplates an arrangement of a multiplicity of figures each carrying a magnet and freely suspended in such manner that the magnets carried by the figures mutually influence each other thereby producing mutual movement of the figures. I also provide means for moving a permanent magnet in a predetermined path beneath a support over which figures having a permanent magnet thereon may be mounted or suspended and movements imparted to the figures in accordance with the path of movement of the controlling magnet. My invention includes means for imparting composite movement of magnet equipped figures through both planetary and curved paths obtainable by 180° reversals of the controlling magnet at periodic intervals as the controlling magnet is moved about an orbit. I also employ means for moving the suspension points for the figures simultaneously with the displacement of the figures in paths about either fixed magnets, movable controlling magnets or both. My invention also contemplates the use of jointed figures having portions thereof weighted so that movements imparted to the figures are supplemented by movements of parts of the figures having different degrees of inertia.

My invention will be more clearly understood by detailed reference to the drawings wherein reference character 1 designates a base from which projects a demountable frame consisting of vertical members 2 across the top of which extends a relatively narrow demountable strip 3. The reason for the demountable construction is to facilitate shipment of the structure which may be readily assembled at the place of use. An eyelet 4 is supported centrally of strip 3 through which hook 5 is engaged and from which fine thread or wire 6 extends. When using a wire, a material may be selected which has a zero temperature coefficient of expansion so that the length of the suspension does not change with temperature. A light weight figure toy 7 is attached to the end of thread 6. The light weight figure toy 7 has a permanent bar magnet 8 attached thereto in a position in which the mass of the bar magnet and the mass of the figure is disposed in a state of balanced equilibrium with respect to the suspension point 9. The length of the connection thread 6 indicated at $a$ with respect to height $b$ of the figure 7 is proportioned in the ratio of approximately four to one. The center of gravity of the combined mass constituted by the figure toy 7 and bar magnet 8 is closely adjacent the lower limit of the figure. The suspension of the figure 7 is such that bar magnet 8 just clears the surface of base 1 in the swinging, spinning and twisting movement thereof. Under these conditions a relatively small force imparted to the figure tends to swing the figure with the suspension point 9 as a pivot. I locate in base 1 a coacting permanent bar magnet 10 which is displaced off-center with respect to the point of suspension 9 about which the figure 7 swings between members 2 as shown more particularly in Fig. 2. Magnet 10 may be suitably embedded in base 1. To facilitate mounting of magnet 10 in base 1, a recess may be formed in base 1 and a relatively thin veneer covering sheet 11 placed over base 1 entirely concealing bar magnet 10. It is important to mount bar magnet 10 as close to the surface 11 of the base 1 as possible in order to secure maximum mutual effect between the magnetic fields of bar magnet 10 and bar magnet 8.

In Fig. 1 I have shown the figure toy 7 swung to the position 7' suspended by the thread in the position 6' whereby bar magnet 8' has the field thereof moved into the field of the fixed bar magnet 10 under the influence of swinging forces imparted to the figure. Under these conditions the figure toy executes spins, twists and movements developed by composite forces developed by the swinging of the figure and by mutual coaction with the bar magnets 8 and 10. The relative polarity of the bar magnets 8 and 10 is not critical and merely for the purpose of explaining my invention I have indicated the north and south poles of bar magnet 8 so disposed to the north and south poles of bar magnet 10 that there is normally a tendency to swing the figure toy 7 to the right of Fig. 1, due to magnetic opposition of the similar north poles or bar magnets 8 and 10. In this arrangement there are times when the spinning figure toy 7 tends to remain suspended in the air in the position shown in dotted lines. Due to mutual affect of bar magnets 8 and 10 upon each other the arrangement of bar magnets may be reversed to secure equally esthetic movements.

In lieu of the ballet dancer figure indicated in Figs. 1 and 2, I may provide a figure in the form of a skater as shown at 12 in Figs. 3 and 4 where the skater is balanced by the extended foot 12a thereof enabling the figure to be perfectly balanced about a central axis passing through bar magnet 14. Bar magnet 14 may be formed in the shape of a skate as shown more particularly in Fig. 5. The blade 15 of the skate shown in Fig. 5 attached to figure 12 itself constitutes the bar magnet 14 and coacts with the permanent bar magnet 10 in the base of the structure or with the movable or multiplicity of magnets hereinafter described.

In lieu of the skater represented in Figs. 3 and 4 I may employ figures simulating boxers such as represented in Figs. 6 and 7 in which the figure 16 is perfectly balanced in a pendent position by the disposition of the arms 16a of the figure as shown and wherein the feet of the figure are attached to permanent magnet 17.

Permanent magnet 17 may coact with the fixed permanent magnet 10 in the base of the device or with a combination of fixed magnets or with a movable magnet suitably driven beneath the base. The boxer figure shown in Figs. 6 and 7 lends itself to arrangements employing suspension mountings of multiple mutually coacting figures. Show window displays employing multiple figures may be arranged in a panoramic setting such as illustrated in Fig. 8. The show window display may include the representation of a village or town pictured generally by houses 18 and 19 with an esthetic arrangement of artificial pond 20 over which figure toys representing ice skaters of the type indicated at 12 in Figs. 3 and 4 are freely suspended on threads 6. The magnets 14 of figure toys 12 represent skates on which the figures apparently glide over the artificial pond 20 and perform esthetic twists and turns under the influence of a concealed rotatable magnet 21. The rotatable magnet 21 located beneath the artificial pond 20 is carried by an arm 22 which is driven from a concealed motor 23. Motor 23 is provided with a suitable reduction gear so that magnet 21 may be driven at a speed of approximately 40 revolutions per minute. The motor may be of any suitable type such as a sample form of electric motor. The variation in movement of the figures and the spins imparted thereto result from the change in position of the coacting bar magnets 21 and 14 as the two magnets pass each other. If two like poles pass adjacent each other there is a tendency for the figure to be repelled in its free swinging orbit simulating the gliding of the skater over the pond. On the next swing two opposite poles may be adjacent each other and there is a tendency to attract the figure toy so that a reverse motion takes place again simulating the various and changing positions of the ice skater. By suitable color treatment and masking of the background the figures are prominently displayed while the suspension threads blend into the background and are practically invisible thereby increasing the esthetic and attractive appearance of the display. Where plain bar magnets are used at 14 on the figures these are suitably painted so that they tend to conform with the pond and background thereby concealing any apparent means of operation for the device. The magnets 14 must be large enough to give a turning movement or torque to the figure. Moreover the weight of the magnet, size of the figure and length of the thread must be maintained in the proportions hereinbefore stated to prevent the figure from wabbling about the vertical axis.

In Fig. 9 I have shown my invention applied to a stage setting in which an ornamental and esthetic container 24 is provided and from which the figures such as ice skaters 12 heretofore described in Figs. 3 and 4 are freely suspended on threads 6, the suspension points of which at 9' and 9" are concealed by the ornamental stage setting 24. Each of the figures 12 have bar magnets 14 secured thereto. The figures are free to swing above the platform 25 but are prevented from contacting each other by partition member 26. Partition member 26 is more useful when the figures employed are in the form of cocks or boxers, etc., and where it is necessary to move such figures into close proximity one with respect to the other. Beneath platform 24 I provide bar magnet 21 carried by arm 22 and rotatably driven through motor 23 equipped with a reduction gear arrangement for limiting the movement of bar magnet 21 to approximately 40 revolutions per minute. Motor 23 may be an electric motor, in which event the motor is suitably energized through a power circuit indicated generally by conductors 27. The suspensions 6 and the bar magnet 14 are substantially obscured by the stage setting so that from a reasonable distance the figures 12, due to their free suspension and the periodic influence of bar magnet 21 on bar magnet 14, appear to simulate the natural movements of skaters and cut many varied figures and execute a variety of spins. Two or more such skaters, suitably separated may be activated by the same rotating magnet.

Figs. 10–15 illustrate a modified arrangement of my invention in which a figure 28 simulating a skater instead of being freely suspended is mounted upon a somewhat wider bar magnet 29 which supports the figure 28 in balanced equilibrium on the surface 30 which simulates an ice pond. Surface 30 is supported by any suitable non-magnetic casing which I have shown generally at 31 having a non-magnetic top portion 32 and a supporting base portion 33. Centrally arranged on base portion 33 interiorly of casing 31 I provide the spring wound motor and reduction gear assembly indicated generally at 34. The spring wound motor 34 is readily wound through exposed key 35 whereby movement at approximately 40 revolutions per minute is imparted to radially extending arm 36. The arm 36 carries on its extremity a vertically disposed stub shaft 37 on which there is journaled in a suitable anti-friction bearing, a horizontally disposed roller 38. Roller 38 has a resilient surface engaging portion 39 thereon which is adapted to establish surface contact with spaced portions of the casing 31 represented at 40 and spaced portions 41 of a concentrically arranged rail member 42. As illustrated in Fig. 11 the side wall of casing 31 is struck inwardly at diametrically opposite portions 40 while in positions displaced 180° therefrom, the rail 42 is struck outwardly as indicated at 41. The portions 40 and 41 engage the resilient surface 39 of roller 38 so that as arm 36 tends to move clockwise, the outstruck portion 41 which is engaged with surface 39 of roller 38 tends to move roller 38 clockwise. When arm 36 reaches the position in the path of movement thereof in which surface 39 of the roller engages instruck portions 40 of casing 31, a reverse movement, due to engagement of surface 39 with portions 40, is imparted to roller 38 so that the roller moves in a counter-clockwise direction as illustrated in the fragmentary view shown in Fig. 13. The importance of this will be understood when it is observed that roller 38 constitutes a support for the horizontally extending bar magnet 43. Bar magnet 43 extends diametrically of roller 38 and in alignment with arm 36. While the bar magnet is thus enabled to turn through 180° during the intervals that arm 36 passes the instruck portions 40 and 41 as heretofore explained, the bar magnet follows a curved path intermediate the positions of 180° twist. To insure the uniform movement of bar magnet 43 in a curved path intermediate the positions of twist, I provide sets of guide rails 44, 45, 46 and 47 located in each of the quadrants transversely of the casing. These sets of guide rails constitute jaws which are flared outwardly at opposite ends as indicated for example at 44a and 44b. Bar magnet 43 is tapered at each end thereof indicated at 43a and 43b so that the tapered end of the bar magnet is readily received between the guide rails and maintained therebetween as the rotation of arm 36 continues. By this arrangement of reversal in position of bar magnet 43 at 90° intervals, spins and twists are imparted to the figure 28 as magnet 29 thereon tends to follow the position of magnet 43 in a pattern such as represented in Fig. 15. The positions about the surface 30 representing the ice pond at which the skater apparently executes a turn is indicated in Fig. 15 at 48, whereas the intermediate glides executed by the skater indicated by the distance 49 is effected during the period that the bar magnet 43 is confined in position in the quadrantal path indicated at 50 in Fig. 11. During this period bar magnet 43 slides between guide rails 44 as illustrated in Fig. 14. Movement of the arm 36 may be arrested by any suitable means such as the lever device 51 pivoted to casing 31 at 52 and controllable from handle 53. The lever device 51 may be moved to the dotted line position 51a for stopping the rotation of arm 36. Lever 51 may be maintained in position 51a or position 51 by engagement in notches in member 54. Other forms of stops may be employed and the form illustrated is merely shown as an example for illustrating the principles of my invention.

The mounting of the figures with magnets attached for free swinging movement through variable magnetic fields results in the establishment of various permutations and combinations of the magnetic forces tending to impart turns and twists to the figures. I may also obtain such movements by rotating the figures in paths in which a multiplicity of spaced permanent magnets are located. An arrangement may be employed such as illustrated in Fig. 16 wherein the figures 12 suspended on thread 6 are moved in circular paths by a mechanism operated by motor and reduction gear system represented at 55. The motor and reduction gear system 55 is supported from beneath the ceiling of ornamental cabinet 56. Shaft 57 of the motor and reduction gear system 55 rotates lever arm 58 to which there is attached at 58a the suspension member 6 of one of the figures on a relatively short radius represented at 59 with the other figure suspended from member 60 on a relatively longer radius represented at 61. One figure moves in an orbit over fixed permanent magnets 62 while the other figure moves in an orbit over fixed permanent magnets 63. Each of the figures execute various twists and turns as the magnets 14 thereon mutually coact with the fields emanating from the sets of magnets 62 and 63.

In Fig. 17 I have shown a further modified form of my invention in which the figure 7 carrying bar magnet 8 is suspended by means of member 64 from the top of cabinet 65. Beneath the platform 66 I arrange a driving motor and reduction gear 67 rotatably driving arm 68 carrying magnet 69 thereon which periodically passes beneath bar magnet 8 attached to figure 7. The suspension 64 may be a substantially invisible elastic member or a substantially invisible thread with a spring or resilient device included therein so that the figure may execute vertical movements in addition to turning and twisting movements controlled by a driving motor system. To increase the attractiveness of the device the figure may be represented as having spread, pivotally connected arms 7a and 7b from the ends of which threads 70 and 71 converge to the suspension point. As the figure rotates and twists under the influence of the revolving magnetic field, threads 70 and 71 wind upon themselves, as a result of which the pivotally connected arms 7a and 7b move upwardly and downwardly as the figure winds and unwinds.

In Fig. 18 I have shown a further modified form of the device of my invention in which a jointed figure 72 is employed having jointed members indicated generally at 73 and 74. Jointed members 73 and 74 have weights 75 and 76 adjacent the extremities thereof so that as the figure spins the jointed members tend to swing outwardly by centrifugal force, thereby imparting a grotesque appearance to the figure. The movement and rotation of the figure is controlled by the mutual coaction of rotating magnet 69 and magnet 77 which depends from figure 72. In the case of a ballet dancer, the skirt of the figure may contain weights which tend to move outwardly under centrifugal force, thereby imparting natural appearance of a dancer to the figure.

In Figs. 19 and 20 I have shown a further modified arrangement of my invention in which the path of figure 12 within a stage setting comprised by cabinet 78 may be controlled by motor 79 concealed above the stage setting and operating rotatable arm 80. A slidable member 81 is carried by arm 80 and is adapted to move back and forth on arm 80 as roller 82 moves in the curved rail system 83. The curved rail system 83 is compositely shaped to guide the member 81 first in a relatively small radius and then in a relatively wide radius for imparting an irregular but periodic path of movement to the figure. A series of fixed magnets 84, 85, 86 and 87 are distributed at spaced intervals in the path of the magnet 14 carried by the moving figure 12. The bar magnets 84, 85, 86 and 87 are confined immediately below the surface of the base 88 by laminated sheet 89. Below the platform 88 I arrange motor 67 driving arm 68, which in this instance carries two bar magnets 90 and 91 alignable beneath bar magnet 14 in any of the positions thereof. The figure is thus subjected to the composite fields of the fixed bar magnets and the rotating bar magnets whereby various permutations and combinations of forces are developed for producing various movements of the figures.

While I have described my invention in certain preferred embodiments, I realize that various modifications and changes may be made and I do not intend any limitations upon my invention other than may be imposed by the scope of the appended claims.

In certain embodiments of my invention the magnets may be of the electromagnetic type instead of the permanent type. Accordingly in the claims where I refer to a magnetic field I intend such field to be established either by a permanent or electromagnet.

What I claim as new and desire to secure by Letters Patent of the United States is as follows:

1. An apparatus of the class described comprising in combination with a supporting structure, a magnet disposed in the base of said structure, an object having a coacting magnet attached thereto, means for freely suspending said object from said structure in a position to swing over the base thereof in variable spaced relation to the magnet in said base, whereby the magnet on said object and the magnet in said base mutually coact for imparting variable movements in space to said object in the course of its free swinging movement over said base.

2. An apparatus of the class described comprising in combination with a supporting structure, a magnet disposed in the base of said structure, an object having a coacting magnet attached thereto, means for freely suspending said object from said structure in a position to swing over the base thereof from a center that is offset from the magnet disposed in said base and in variable spacial relation thereto, whereby the magnet on said object and the magnet in said base mutually coact for imparting variable movements in space to said object in the course of its free swinging movement over said base.

3. An apparatus of the class described comprising in combination with a supporting structure, a magnet disposed in the base of said structure, a normally balanced figure carrying a magnet, means for freely suspending said figure from said supporting structure so that the magnet carried by the figure is maintained in variable spacial relation to the magnet disposed in said base and is adapted to coact with the magnet in the base as the figure swings freely through the magnetic field of the magnet in the base for imparting variable movements in space to said figure.

4. An apparatus of the class described comprising in combination with a supporting structure, a magnet disposed in the base of said structure, a normally balanced figure having a magnet attached thereto, and means for suspending said figure from said supporting structure in variable spacial relation to the magnet in said base whereby movements imparted to said figure enable said figure to swing freely through the magnetic field of the magnet in the base in variable spacial relation thereto for effecting various twists and turns in the position of said figure in space.

5. An apparatus of the class described comprising in combination with a supporting structure, a magnet disposed in the base of said structure, a normally balanced figure having a magnet attached thereto, and means for suspending said figure from said supporting structure, whereby said figure swings freely in space through the magnetic field of the magnet in the base for variably effecting various twists and turns in the position of said figure in space, the means for suspending said figure being proportioned to the height of said figure in a ratio of approximately 4 to 1.

6. An apparatus of the class described comprising in combination with a supporting structure, a magnet disposed in the base of said structure, a normally balanced figure having a magnet attached thereto, means for suspending said figure from said supporting structure, whereby the magnet attached to said figure swings freely in space through the magnetic field of the magnet in the base for mutually imparting various twists and turns in the position of said figure, and means for rotatably driving said first mentioned magnet with respect to said base for producing various permutations and combinations of forces reactive upon said figure.

7. An apparatus of the class described comprising in combination with a supporting structure, a magnet disposed in the base of said structure, a normally balanced figure having a magnet attached thereto, means for suspending said figure from said supporting structure, whereby the magnet attached to said figure swings freely in space through the magnetic field of the magnet in the base for mutually imparting various twists and turns in the position of said figure, and means for moving said first mentioned magnet in a prearranged path with respect to said base for producing various permutations and combinations of forces reactive upon said figure.

8. An apparatus of the class described comprising in combination with a supporting structure, a magnet disposed in the base of said structure, a normally balanced figure having a magnet attached thereto, means for suspending said figure from said supporting structure, whereby the magnet attached to said figure swings freely in space through the magnetic field of the magnet in the base for mutually imparting various twists and turns in the position of said figure, and a separate magnet rotatably driven with respect to said base and coacting with each of the aforesaid magnets for effecting various permutations and combinations of forces effective for turning and twisting said suspended figure.

9. In an apparatus of the class described in combination, a supporting structure, a figure having pivotally connected movable portions, inertia operated means carried by certain movable portions of said figure, a magnet carried by said figure, means for suspending said figure with respect to said structure, a spacially related coacting magnet supported within the magnetic field of said first mentioned magnet, and means for variably shifting the position of said coacting magnet with respect to said structure for controlling the movement of said suspended figure in space and the position of the inertia operated means carried by movable portions thereof.

10. The method of motivating objects which comprises applying a magnet to an object, suspending the object for free orbital swinging movement in space, and subjecting the magnet thereon in the course of the swings of the object to the influence of a varying magnetic field for developing permutations and combinations of magnetic forces for effecting variable twists and turns of the object in space during the swinging thereof.

11. The method of motivating objects which comprises applying a magnet to an object, suspending the object for free swinging movement in space, and subjecting the magnet thereon in the course of the swings of the object in space to the influence of a recurring magnetic field enveloping the field of the aforesaid magnet at various positions during the free swinging movement thereof for imparting various twists and turns to the object in space.

FRANCIS W. DUNMORE.